US008962176B2

(12) United States Patent
Caumont et al.

(10) Patent No.: US 8,962,176 B2
(45) Date of Patent: Feb. 24, 2015

(54) MODULE FOR ELECTRICAL ENERGY STORAGE ASSEMBLIES HAVING A FLAT CONNECTING STRIP

(75) Inventors: Olivier Caumont, Quimper (FR); Jean-Michel Depond, Quimper (FR); Anne-Claire Juventin, Quimper (FR)

(73) Assignee: Blue Solutions, Ergue Gaberic (FR)

( * ) Notice: Subject to any disclaimer, the term of this patent is extended or adjusted under 35 U.S.C. 154(b) by 1262 days.

(21) Appl. No.: 12/677,503

(22) PCT Filed: Sep. 12, 2008

(86) PCT No.: PCT/EP2008/062129
§ 371 (c)(1),
(2), (4) Date: Jun. 23, 2010

(87) PCT Pub. No.: WO2009/034163
PCT Pub. Date: Mar. 19, 2009

(65) Prior Publication Data
US 2010/0266890 A1    Oct. 21, 2010

(30) Foreign Application Priority Data

Sep. 13, 2007  (FR) ..................................... 07 06423

(51) Int. Cl.
*H01M 2/24*    (2006.01)
*H01M 6/42*    (2006.01)
*H01G 9/00*    (2006.01)
*H01G 4/38*    (2006.01)
*H01M 2/04*    (2006.01)
*H01G 9/04*    (2006.01)
*H01M 2/10*    (2006.01)
*H01M 2/20*    (2006.01)

(52) U.S. Cl.
CPC ............. *H01M 2/0426* (2013.01); *H01G 9/058* (2013.01); *H01M 2/1094* (2013.01); *H01M 2/204* (2013.01); *Y02E 60/13* (2013.01)
USPC ............................ 429/158; 361/328; 361/434

(58) Field of Classification Search
USPC ........................................ 429/400–535, 158
See application file for complete search history.

(56) References Cited

U.S. PATENT DOCUMENTS

| 6,063,525 | A | 5/2000 | LaFollette |
| 2006/0146480 | A1* | 7/2006 | Thrap ........................... 361/522 |
| 2007/0053140 | A1 | 3/2007 | Soliz |
| 2007/0054559 | A1 | 3/2007 | Thrap et al. |
| 2008/0013253 | A1 | 1/2008 | Thrap et al. |
| 2008/0266752 | A1 | 10/2008 | Thrap et al. |

FOREIGN PATENT DOCUMENTS

| EP | 1 450 422 A1 | 8/2004 |
| EP | 1 887 591 A1 | 2/2008 |

(Continued)

*Primary Examiner* — Sarah A Slifka
(74) *Attorney, Agent, or Firm* — Blakely Sokoloff Taylor & Zafman

(57) ABSTRACT

The invention relates to a module comprising at least two electrical energy storage assemblies (20), each storage assembly (20) comprising a first face topped by a cover (30) electrically connected to said energy storage assembly (20) and a second face opposite the first face, each cover being in contact with a respective end of a strip (40) in order to electrically connect the two storage assemblies (20), in which the strip (40) and the faces of the covers (30) in contact with the strip (40) are flat, the strip (40) being welded to the faces of the covers (30) along weld leads (50, 50').

32 Claims, 3 Drawing Sheets

(56) References Cited

FOREIGN PATENT DOCUMENTS

| FR | 2 771 218 | 5/1999 |
| FR | 2 871 615 | 12/2005 |
| FR | 2 894 381 | 6/2007 |
| WO | WO 2006/121006 A1 | 11/2006 |

* cited by examiner

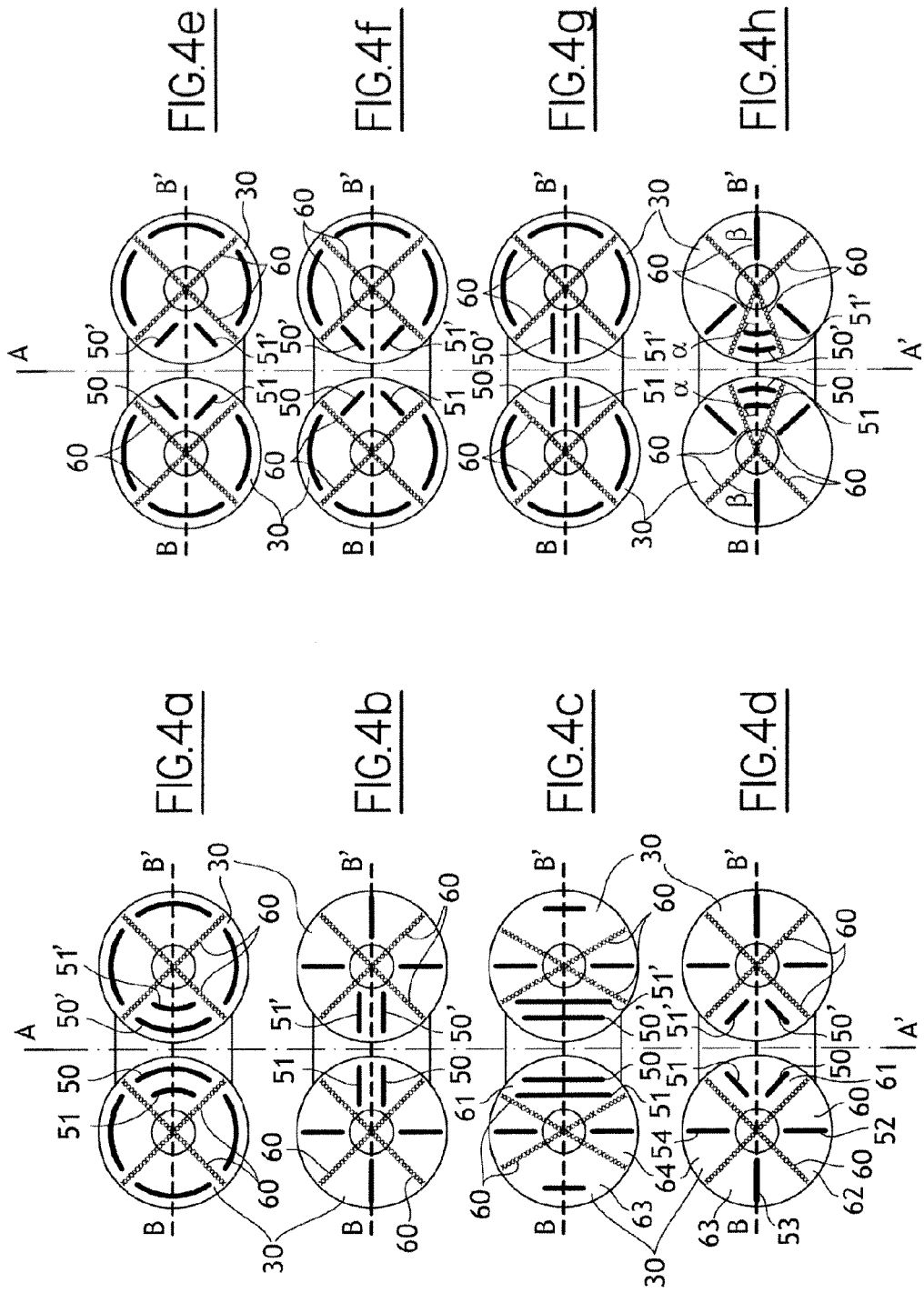

MODULE FOR ELECTRICAL ENERGY STORAGE ASSEMBLIES HAVING A FLAT CONNECTING STRIP

This is a non-provisional application claiming the benefit of International application number PCT/EP2008/062129 filed Sep. 12, 2008

The present invention relates to the general technical field of electric energy storage assemblies.

More particularly the invention relates to the field of modules comprising at least two electric energy storage assemblies.

Within the scope of the present invention "electric energy storage assembly" is understood to mean either a condenser (i.e. a passive system comprising two electrodes and an insulator), or a supercondenser (i.e. a system comprising at least two electrodes, an electrolyte and at least one separator), or a battery of lithium battery type (i.e. a system comprising an anode, a cathode and an electrolyte solution between the anode and the cathode).

GENERAL PRESENTATION OF PRIOR ART

Modules such as illustrated in FIG. 1 are known, comprising a casing 110 in which several electric energy storage assemblies 120 connected by connection means are arranged.

When the module comprises more than two storage assemblies 120, the storage assemblies 120 are connected in pairs alternatively at the level of their upper and lower ends.

As illustrated schematically in FIG. 1, the connection means enabling electric connection of two adjacent storage assemblies 120 comprise two covers 130 and a strip 140.

Each cover 130 is intended to top a storage assembly 120 respective so as to be connected electrically to the latter.

Each cover 130 further comprises a connection terminal 131 capable of making contact with a bore passing through the strip 140 to electrically connect two adjacent storage assemblies 120.

The covers 130 are connected to the joining strip 140 of two adjacent storage assemblies 120 either by forced nesting of the strip 140 on the connection terminals 131 of the covers 130, or by laser welding, or otherwise edge to edge between the strip 140 and the terminals 131, or both combined.

These two electric connection means on the one hand require tight tolerances of the terminals and strips and on the other hand precise mutual alignment of the pieces to finally ensure production of a quality module, resulting in substantial production costs. More particularly, the covers 130 are assembled on the tube enclosing the element by rolling or crimping. To enable such assembly, on the periphery of its face in contact with the strip 140 each cover 130 comprises a circular edge 132 known as <<overlapping>> extending axially to the exterior of the cover.

The presence of this peripheral overlapping edge 132 on each of the faces of the covers 130 in contact with the strip 140 requires using one or the other of the solutions specified hereinbelow: using a strip 140 having complex geometry to span the overlaps 132 of the connected covers 130: this solution causes a decrease in contact surface between the joining strip 140 and the cowling 111 of the casing 110, by means or not of an intermediate material. This causes difficulties in managing cooling of such a module. Using a flat joining strip 140 (extending in a principal plane) elevated relative to the overlap due to pions (extending perpendicularly to the principal plane) and intended to come in contact with the covers: using a flat elevated joining strip relative to the overlapping of the cover, connecting to a terminal 131 higher than the overlapping, though without adding pions, implying that tools must stay in position during the welding operation, or that the strip must be force-fitted onto the terminal 131 to keep in place during the welding operation.

These two latter solutions cause a decrease in contact surface between the joining strip 140 and each cover 130, since contact is limited to the thickness of the strip and/or the width of the pions. This causes difficulties in thermal evacuation, in controlling series resistance, premature wear of the storage assemblies. Another disadvantage of these three types of operation is the difficulty in producing modules where the elements are correctly aligned, and where the strips are parallel to the surface of the covers.

An aim of the invention is to propose a module which would eliminate at least one of the above drawbacks.

PRESENTATION OF THE INVENTION

For this purpose a module comprising at least two electric energy storage assemblies is provided, each storage assembly comprising a first face topped by a cover connected electrically to said energy storage assembly and a second face opposite the first face, each cover being in contact with a respective end of a strip to connect the two storage assemblies electrically, in which the strip and the faces of the covers in contact with the strip are planar, the strip being welded on the faces of the covers along thinning areas of the strips (arrangements of strips provided for welding needs).

So the presence of welding beads and the absence of circular overlapping edges on the peripheries of the faces of the covers combined with use of planar binding strips reduce production costs of the modules. This combination also maximises the contact surface between the strip and the covers on the one hand, minimising series resistance $R_s$, and between the strip and the cowling (with or without intermediate material) on the other hand, making it easier for thermal exchanges between the interior and exterior of the module.

Preferred though non-limiting aspects of the module according to the invention are the following, considered individually or in combinations:

it comprises a casing (10) in which the storage assemblies (20) are arranged.

each cover (30) comprises a connection terminal (31) on its external face intended to be in electric contact with an end of the strip (40) at the level of a bore passing through the strip (40).

the two storage assemblies (20) and the welding beads (50, 50') are symmetrical relative to a median plane (A-A') arranged mid-distance from the axes of revolution of the storage assemblies (20).

the welding beads (50, 50') of the two storage assemblies (20) are arranged opposite one another.

the welding beads (50, 50') of the two storage assemblies (20) are arranged opposite one another.

the strip (40) is welded on each face of a cover (30) along at least one welding bead (50, 50').

each energy storage assembly (20) is connected electrically to the strip (40) along at least two welding beads (50, 51 and 50', 51').

the welding beads (50, 51 and 50', 51') are symmetrical relative to a plane (B-B') passing through the axes of revolution of the energy storage assemblies (20).

each welding bead (50, 51 and 50', 51') is in the form of a quarter circle, a first welding bead (50, 50') extending to the periphery of the cover (30) and a second welding bead (51, 51') extending along a radius median of the cover (30).

the two welding beads (50, 51 and 50', 51') are rectilinear and extend parallel to the plane of symmetry (B-B') passing through the axes of revolution of the two storage assemblies (20).

the two welding beads (50, 51 and 50', 51') are rectilinear and extend perpendicularly to the plane B-B' of symmetry passing through the axes of revolution of the storage assemblies.

the two welding beads (50, 51 and 50', 51') are rectilinear and form an angle with the plane of symmetry (B-B') passing through the axes of revolution of the two storage assemblies (20).

each storage assembly (20) comprises a coil element welded to the cover (30) along at least two welding generatrices (60), the welding beads (50, 51 and 50', 51') being arranged so as not to overlap the welding generatrices (60).

each storage assembly (20) comprises at least four welding generatrices (60) extending radially, each generatrix (60) forming an angle relative to the plane of symmetry passing through the axes of revolution of the storage assemblies (20).

the welding generatrices (60) extending radially are symmetrical in pairs relative to the plane of symmetry (B-B') passing through the axes of revolution of the storage assemblies (20).

the welding generatrices (60) extend along the diameters of the covers (30).

the welding generatrices (60) are perpendicular relative to one another so as to delimit quadrants (61, 62, 63, 64).

for each storage assembly (20), the welding beads (50, 51 and 50', 51') are arranged in a quadrant (61).

the other quadrants (62, 63, 64) each comprise at least another welding bead (52, 53, 54).

the other weldings (52, 53, 54) are in the form of a quarter circle.

the other welding beads (52, 53, 54) are rectilinear.

at least two other beads extend perpendicularly to the plane passing through the axes of revolution of the storage assemblies.

one of the other welding beads extends in the plane passing through the axes of revolution of the storage assemblies.

at least three other beads extend perpendicularly to the plane passing through the axes of revolution of the storage assemblies.

each strip comprises superposition of metal hoops.

the hoops are weldable by resistance.

each hoop is made of aluminium.

each strip is made of aluminium.

the strip is laser-welded by transparency on the covers.

the welding of the strip is done via counterbores.

the strip is welded to the cover by diffusion brazing on all or part of the contact surfaces between the strip and the covers.

it comprises thermal dissipation elements between the cowling of the casing and the strip and the covers to thermally connect while electrically insulating the casing and the energy storage assemblies.

the thermal dissipation elements between the elements and the wall of the module comprise a layer of elastomer.

PRESENTATION OF THE FIGURES

Other characteristics, aims and advantages of the present invention will emerge from the following description, which is purely illustrative and non-limiting and must be viewed in light of the attached diagrams, in which:

FIGS. 4a to 4h and 5 illustrate other embodiments of welding beads,

DESCRIPTION OF THE INVENTION

Figure 1:
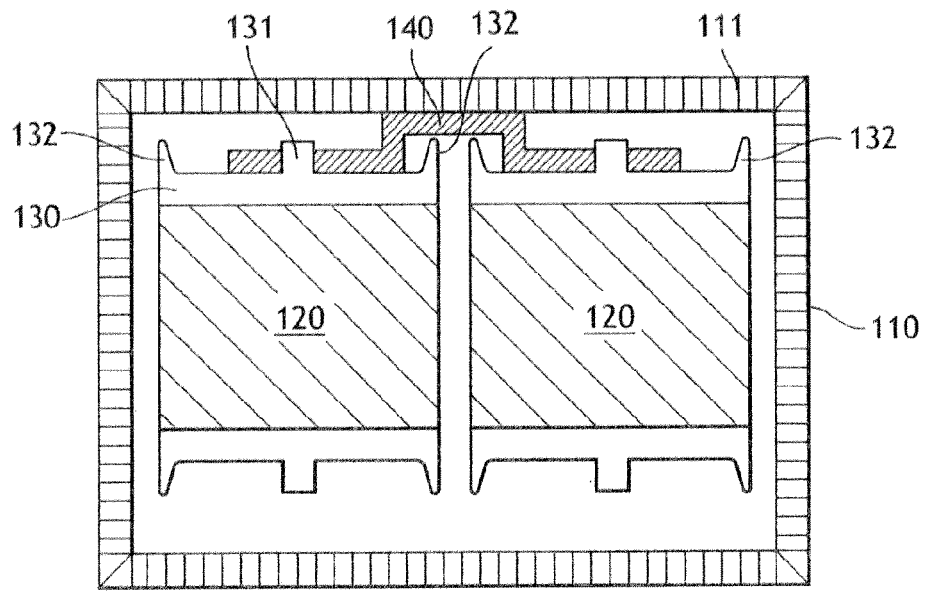
FIG. 1 illustrates an embodiment of a module of the prior art.
Figure 2A:
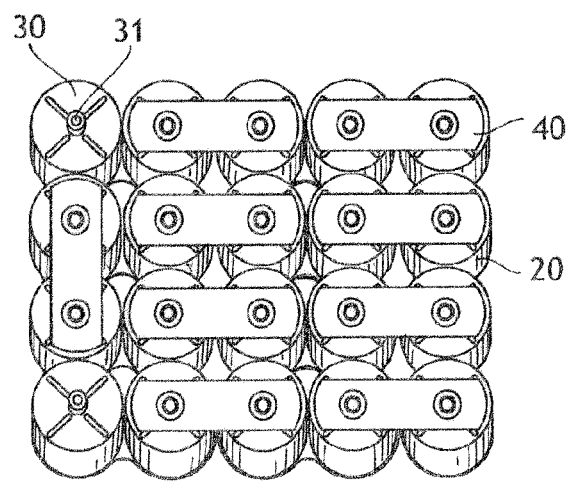
FIGS. 2, 2a, 2b illustrate a module according to the invention.
Figure 2B:
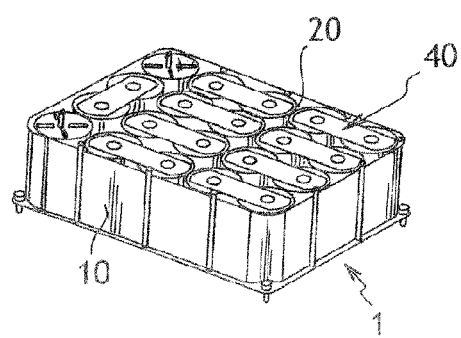
Figure 2:
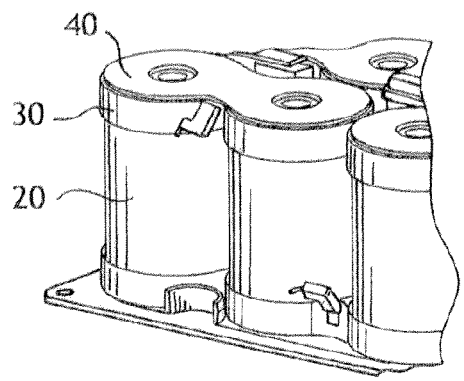

Different embodiments of the module according to the invention will now be described in reference to the figures. In these different figures, the equivalent elements of the module bear the same reference numerals. As illustrated in FIG. 2b, the module 1 comprises a casing 10 in which at least two electric energy storage assemblies 20 are arranged.

The storage assemblies 20 have an overall cylindrical shape. The storage assemblies 20 are arranged side by side in the casing 10. In other terms, the axes of revolution of the storage assemblies 20 are parallel. In the embodiment illustrated in FIGS. 2a and 2b, the storage assemblies 20 are arranged so that their axes of revolution are perpendicular to the lower wall of the casing 10. In other variants not shown here, the storage assemblies can be parallelepiped, square, oval, hexagonal in shape, without this changing the general principles of the invention.

Each storage assembly 20 comprises a first face topped by a cover 30 connected electrically to the energy storage assembly 20 along the welding generatrices.

Each cover may or may not comprise a connection terminal at the centre of its face intended to come in contact with the joining strip.

A particular feature of the module according to the invention is that: i) the joining strip 40 and the face of each cover 30 intended to come in contact with the strip 40 are planar, and that ii) the strip 40 and the covers 30 are connected by welding by transparency in forming welding beads along the thinning areas of the thickness of the strips. Within the scope of the present invention "planar face" is understood to mean a cover, a generally flat face, comprising or not a connection terminal. In other terms, "face plane" is understood to mean a cover, a cover face whereof the periphery comprises no edge extending to the exterior parallel to the axis of revolution of the storage assembly.

Welding by transparency is understood to mean the act of welding two superposed pieces by a beam of energy passing through the upper piece to be welded either via a thinned part of the latter, if the piece is thick, or via its entire thickness, if the piece is thin. Welding by transparency opposes edge to edge welding, consisting of welding two pieces positioned edge to edge by a beam of energy not passing through, but adjusted to the form of the edges to be welded, and positioned with precision at the interface of the edges to be welded.

The combination of these characteristics has the following advantages:

this lowers production costs of such modules, this maximises the contact surface between the strip and the cover on the one hand (lowering series resistance of the module) and between the strip and the cowling of the casing on the other hand (maximising thermal transfers between the strip and the casing), this improves rigidity of the assembly constituted by the storage assemblies, covers and strips, this also improves vibration performance of the assembly constituted by the storage assemblies, covers and strips, this also lowers the height of the elements/bars assembly and accordingly minimises overall volume of the module, accordingly boosting energy and overall volumic capacity of the module.

In addition, using a flat strip 40 and flat covers 30 also uses the contact surface between the strip 40 and the cover 30 to the maximum to produce welding beads whereof the length and position are selected as a function of applications and parameters of a preferred module.

Figure 3:
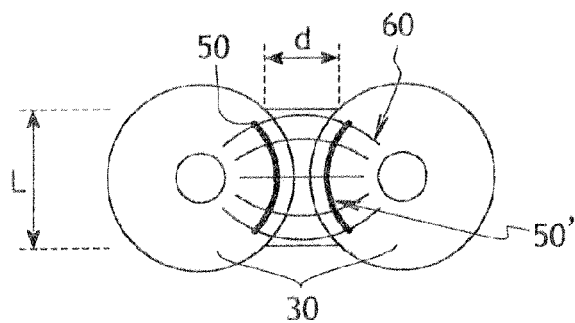
FIG. 3 illustrates an embodiment of welding beads.

In reference to FIG. 3, an example of arrangement and form of welding beads is illustrated.

Each end of the joining strip is welded on a face of respective cover 30 along a welding bead 50, 50'.

Each welding bead 50, 50' is in the form of a quarter circle along the periphery of the cover 30.

The welding beads 50, 50' are arranged opposite one another, minimising series resistance of the cover/bar/cover connection.

In fact, as restated hereinbelow, the ohmic resistance R of the joining strip 40 in the central zone situated between two closest welding beads 50, 50', each welding bead 50, 50' connecting the strip 40 to a unit cover 30 different is given by:

$$R = \frac{\rho \times d}{S}$$

where:
d is the distance between the two welding beads opposite one another,
S is the section of the strip located between the two welding beads, (S=L×e, with e the thickness of the strip and L the width of the bar),
p is the electric resistivity of the material of the bar.

To minimise the ohmic resistance R of the cover/bar/cover connection, the distance "d" between the welding beads 50, 50' can be decreased to a minimum and/or the length of the welding beads can be maximised. In fact, in the case of bonding by welding it is estimated that 95% of the current passes via the welding beads 50, 50' and only 5% by contact from piece to piece, outside the bead. A compromise between length and number of welding beads 50, 50' to be made accordingly has to be found, as well as the number of welding operations to be carried out.

The form in a quarter circle of each welding bead and its position to the periphery of the cover maximise the length of the welding beads. This facilitates passage of the current (along field lines 60) from one storage assembly to the other and accordingly reduces the ohmic resistance of the bar.

Minimising the number of welding beads 50, 50' per cover reduces production costs and time.

Of course, other embodiments of the welding beads are feasible according to the application.

In reference to FIGS. 4a to 4h and 5, these illustrate different variants of connection beads.

Two storage assemblies are arranged symmetrically relative to a median plane A-A' situated mid distance between the axes of revolution of the two storage assemblies 20.

Each cover 30 is connected electrically to a respective end of the strip (not shown) at the level of at least two welding beads 50, 51 and 50', 51'.

These welding beads 50, 51 and 50', 51' will be called "main welding beads" hereinafter, in reference to the fact that passage of the current between two storage assemblies occurs mainly in the zone which they delimit. This is associated with different parameters such as the position of these main welding beads relative to one another on the cover or the form of these main welding beads.

The form of the main welding beads 50, 51 and 50', 51' is variable. According to a variant (illustrated in FIGS. 4a and 5), the main welding beads 50, 51 and 50', 51' are in the form of a quarter circle. This maximises the length of the welding beads.

According to another variant (illustrated in FIG. 4h), the main welding beads 50, 51 and 50', 51' are in the form of a portion of a circle.

According to yet another variant (illustrated in FIGS. 4b to 4g), the main welding beads 50, 51 and 50', 51' are rectilinear in form. This facilitates the welding operation of the strip on the covers, rectilinear welding being simpler to do than curved welding. The main welding beads 50, 51 and 50', 51' of the covers are symmetrical relative to the median plane A-A'. In other terms the main welding beads 50, 51 of one of the covers are symmetrical to the main welding beads 50', 51' of the other cover relative to the median plane A-A'. In addition, the main welding beads 50, 51 and 50', 51' are symmetrical relative to a plane B-B' passing through the axes of revolution of the storage assemblies 20.

This permits smooth passage of the current between the two storage assemblies 20.

Figure 5:
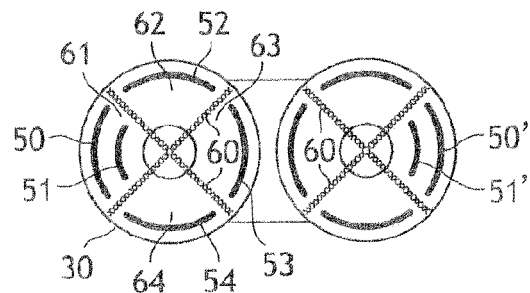

In the embodiment illustrated in FIG. 5, the main welding beads 50, 51 and 50', 51' are arranged opposite one another on their respective cover 30.

This better distributes passage of the current over the entire surface of the joining strip, evening out distribution of the current in the whole winding of the storage element 20, which can increase the life of the module by preventing the above winding from being asymmetrically overloaded and in any case reducing wear of the joining strip 40.

In the embodiments illustrated in FIGS. 4a to 4h, the main welding beads 50, 51 and 50', 51' are arranged opposite one another. This decreases the ohmic resistance of the strip 40 while minimising the distance between the main welding beads 50 and 50', and 51 and 51'.

Each cover 30 can comprise or not a connection terminal 31 on its external face intended to be in electric contact with one end of the strip 40 at the level of a bore passing through the strip 40. The presence of a connection terminal 31 makes it easy to position the strip 40 on the covers 30. The absence of connection terminal 31 on the covers 30 decreases the total volume of the module, and accordingly increases the volumic power of the module. The position of the main welding beads 50, 51 and 50', 51' on the covers 30 may vary.

In the case of welding beads in a quarter circle, these can be arranged: one on the periphery and the other in a median zone of the cover (FIGS. 4a and 5).

In the case of main rectilinear welding beads 50, 51 and 50', 51', these can extend parallel to the plane B-B' passing through the axes of revolution of the two storage assemblies (FIGS. 4b, 4g).

This decreases the ohmic resistance of the strip 40 (and accordingly heat production by effect Joule of the strip).

However, in this case, the current circulates mainly along the main welding beads 50, 51 and 50', 51', possibly causing local heating of the strip 40 along the main welding beads 50, 51 and 50', 51'.

The main rectilinear welding beads 50, 51 and 50', 51' can also extend perpendicularly to the plane B-B' extending between the axes of revolution of the storage assemblies 20 (FIG. 4c).

This avoids the risk of deterioration associated with local heating mentioned hereinabove in allocating passage of the current from one storage assembly 20 to the other over the entire width of the strip 40. The main welding beads 50, 51 and 50', 51' can also have an angle with the plane B-B' passing through the axes of revolution of the storage assemblies 20 (FIGS. 4d to 4f).

They can be arranged radially, that is, near each other at the level of the centre of the cover 30, the distance between the main welding beads 50, 51 and 50', 51' increasing as the periphery of the cover 30 is approached (FIGS. 4d and 4e).

This benefits passage of the current to the periphery of the strip 40.

They can also be positioned at a distance from each other at the level of the centre of the cover 30, the distance between the main welding beads 50, 51 and 50', 51' diminishing as the periphery of the cover 30 is approached (FIG. 4f).

This benefits passage of the current via the centre of the strip 40.

As illustrated in FIGS. 4a to 4h and 5, the cover 30 is also welded to the storage assemblies 20 along the welding generatrices 60.

As per the embodiment, each storage assembly can be welded to a respective cover along the two welding generatrices 60, or more than two welding generatrices 60.

In some embodiments such as illustrated in FIG. 4h, each cover 30 is welded to a respective storage assembly 20 along the four welding generatrices 60 extending radially, each welding generatrix 60 having an angle with the plane B-B' extending between the axes of revolution of the storage assemblies 20. More particularly, the welding generatrices 60 intended to be opposite the adjacent storage assembly 20 to be connected electrically has an angle α with the plane B-B' which is less than the angle β between this same plane B-B' and the generatrices farthest from the adjacent storage assembly 20 to be connected.

This makes it easy for the current to pass from one storage assembly 20 to the other and increase the solidity of the bond between the storage assembly 20 and its assigned cover 30 in this current passage zone.

In other embodiments illustrated in FIGS. 4a to 4g and 5, each cover is welded to a respective storage assembly along the two welding generatrices 60 extending along the diameters of the cover 30 to delimit portions of the circumference of the cover.

This simplifies the welding operation of the covers 30 on the storage assemblies 20.

To ensure certain homogeneity of cover/storage assembly fixing quality under the whole surface of the cover 30, the welding generatrices 60 can be perpendicular relative to one another (cf. FIGS. 4a, 4b, 4d to 4g and so as to quadrants.

Advantageously, the main welding beads 50, 51 and 50', 51' can be arranged so as not to overlap the welding generatrices 60.

This reduces localised heating of the strip 40. In the embodiments the main welding beads 50, 51 and 50', 51' are arranged in one 61 of the four cover portions 61, 62, 63, 64 delimited by the welding generatrices 60, whether these four cover portions 61, 62, 63, 64 have equal surfaces or not.

Advantageously, each of the other cover portions 62, 63, 64 can comprise one or more extra respective welding beads 52, 53, 54. This welding bead will be qualified hereinbelow as secondary welding bead.

This improves the quality of the bond between the cover 30 and the strip 40.

As illustrated in FIGS. 4a, 4e to 4g, and 5, each other quadrant 61, 62, 63, 64 can comprise a secondary welding bead 52, 53, 54 in the form of a quarter circle arranged on the periphery of the cover 30.

This maximises the length of the secondary beads 52, 53, 54.

These secondary welding beads 52, 53, 54 such as shown in FIGS. 4b to 4d and 4h can also be rectilinear, parallel, perpendicular or forming an angle with the plane B-B' for the same reasons as cited earlier in reference to the main welding beads 50, 51 and 50', 51'.

Figure 6:
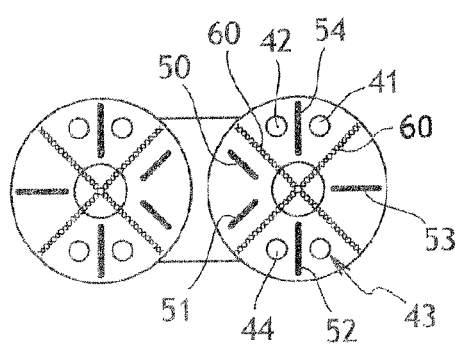
FIG. 6 illustrates another embodiment of beads and welding points of a strip of the module according to the invention.

In an embodiment illustrated in FIG. 6, each strip 40 is constituted by superposition of metal hoops weldable by resistance, for example made of aluminium. Superposition of hoops is welded by resistance point by point at the level of welding points 41, 42, 43, 44. These welding points 41, 42, 43, 44 are preferably not aligned with the welding beads and the welding generatrices.

The welding of the strip on the cover can be done by laser welding by transparency, for example along the counterbores arranged on the strip 40.

An alternative to laser welding by transparency can be diffusion brazing, for example by Gallium, of all or part of the contact surfaces between the strip and the covers.

It is evident by way of advantage that such welding of the strips on the covers of the elements, such as undertaken according to the invention described hereinabove, produces a complete module, either prior to electrolyte impregnation operations of the elements, or after these operations, if provision has been made for the covers and the strips to have impregnation orifices.

The reader will also have understood that numerous modifications can be made to the process and device described earlier without departing in material terms from the novel ideas and advantages described here.

It is especially evident that connections can be made per strip according to the invention on the two covers of each element, and not only on the upper cover.

Consequently, all modifications of this type are within the reach of the module according to the invention such as defined in the attached claims.

The invention claimed is:

1. A module comprising at least two electric energy storage assemblies, each electric energy storage assembly comprising a face topped by a cover electrically connected to said electric energy storage assembly, each said cover being in contact with a respective end of a strip in order to electrically connect the at least two electronic energy storage assemblies, wherein each said cover is devoid of an edge extending to an exterior parallel to a revolution axis of the storage assembly, and the strip being welded on the covers in contact with the strip along welding beads and wherein each said electric energy storage assembly comprises a coil element welded to the cover of said electric energy source assembly along at least two welding connections, the welding beads being arranged so as not to overlap the welding connections.

2. The module as claimed in claim 1, wherein the module comprises a casing in which the storage assemblies are arranged.

3. The module as claimed in claim 2, wherein the module comprises thermal dissipation elements between a cowling of a casing and the strip and the covers so as to connect thermally while electrically insulating the casing and each of the at least two electric energy storage assemblies.

4. The module as claimed in claim 3, wherein the thermal dissipation elements comprise a layer of elastomer.

5. The module as claimed in claim 1, wherein each cover comprises a connection terminal for electrical contact with an end of the strip at a level of a bore passing through the strip.

6. The module as claimed in claim 1, wherein the at least two electric energy storage assemblies and the welding beads are symmetrical relative to a median plane arranged at a mid distance from the axes of revolution of each of the electric energy storage assemblies.

7. The module as claimed in claim 1, wherein the welding beads of the at least two electric energy storage assemblies are arranged in front of one another.

8. The module as claimed in claim 1, wherein the welding beads of the at least two electric energy storage assemblies are arranged opposite one another.

9. The module as claimed in claim 1, wherein the strip is welded on the cover in contact with the strip along at least one welding bead.

10. The module as claimed in claim 1, wherein each electric energy storage assembly of the module is connected electrically to the strip along at least two welding beads.

11. The module as claimed in claim 10, wherein the at least two welding beads are symmetrical relative to a plane passing through the axes of revolution of each of the at least two electric energy storage assemblies.

12. The module as claimed in claim 10 or claim 11, wherein the at least two welding beads are rectilinear and extend parallel to the plane of symmetry passing through the axes of revolution of each of the at least two electric energy storage assemblies.

13. The module as claimed in claim 10 or claim 11, wherein the at least two welding beads are rectilinear and extend perpendicularly to a plane of symmetry passing through the axes of revolution of each of the at least two electric energy storage assemblies.

14. The module as claimed in claim 10 or claim 11, wherein the at least two welding beads are rectilinear and form an angle with the plane of symmetry passing through the axes of revolution of each of the at least two electric energy storage assemblies.

15. The module as claimed in claim 1, wherein each welding bead is in the form of a quarter circle, a first welding bead extending to the periphery of the cover and a second welding bead extending along a median radius of the cover.

16. The module as claimed in claim 1, wherein each electric energy storage assembly comprises at least four welding connections extending radially, each welding connection forming an angle relative to the plane of symmetry passing through the axes of revolution of the at least two electric energy storage assemblies.

17. The module as claimed in claim 16, wherein the welding connections extending radially are symmetrical in pairs relative to the plane of symmetry passing through the axes of revolution of the electric energy storage assemblies.

18. The module as claimed in claim 1, wherein the welding connections extend along diameters of the covers.

19. The module as claimed in claim 18, wherein the welding connections are perpendicular relative to one another so as to delimit quadrants.

20. The module as claimed in claim 19, wherein for each electric energy storage assembly, the at least two welding beads are arranged in one of said quadrants.

21. The module as claimed in claim 20, wherein the other said quadrants each comprise at least one welding bead.

22. The module as claimed in claim 21, wherein each of the at least one welding beads is in the form of a quarter circle.

23. The module as claimed in claim 21, wherein the each of the at least one welding beads is rectilinear.

24. The module as claimed in claim 23, wherein at least two other welding beads extend perpendicularly to the plane passing through the axes of revolution of the at least two electric energy storage assemblies.

25. The module as claimed in claim 24, wherein one of the other welding beads extends in the plane passing through the axes of revolution of each of the at least two electric energy storage assemblies.

26. The module as claimed in claim 24, wherein at least three other welding beads extend perpendicularly to the plane passing through the axes of revolution of each of the at least two electric energy storage assemblies.

27. The module as claimed in claim 1, wherein each strip comprises superposition of metal hoops.

28. The module as claimed in claim 27, wherein the hoops are welded by resistance.

29. The module as claimed in claim 28, wherein each strip is made of aluminium.

30. The module as claimed in claim 1, wherein the strip is laser welded by transparency on the covers.

31. The module as claimed in claim 1, wherein the welding of the strip is carried out via counterbores.

32. The module as claimed in claim 1, wherein the strip is welded to the cover by brazing diffusion on all contact surfaces between the strip and the covers.

* * * * *